Dec. 11, 1962 E. L. CAMPBELL 3,067,437
ADJUSTABLE BED FOR TRUCKERS
Filed May 27, 1960 3 Sheets-Sheet 1
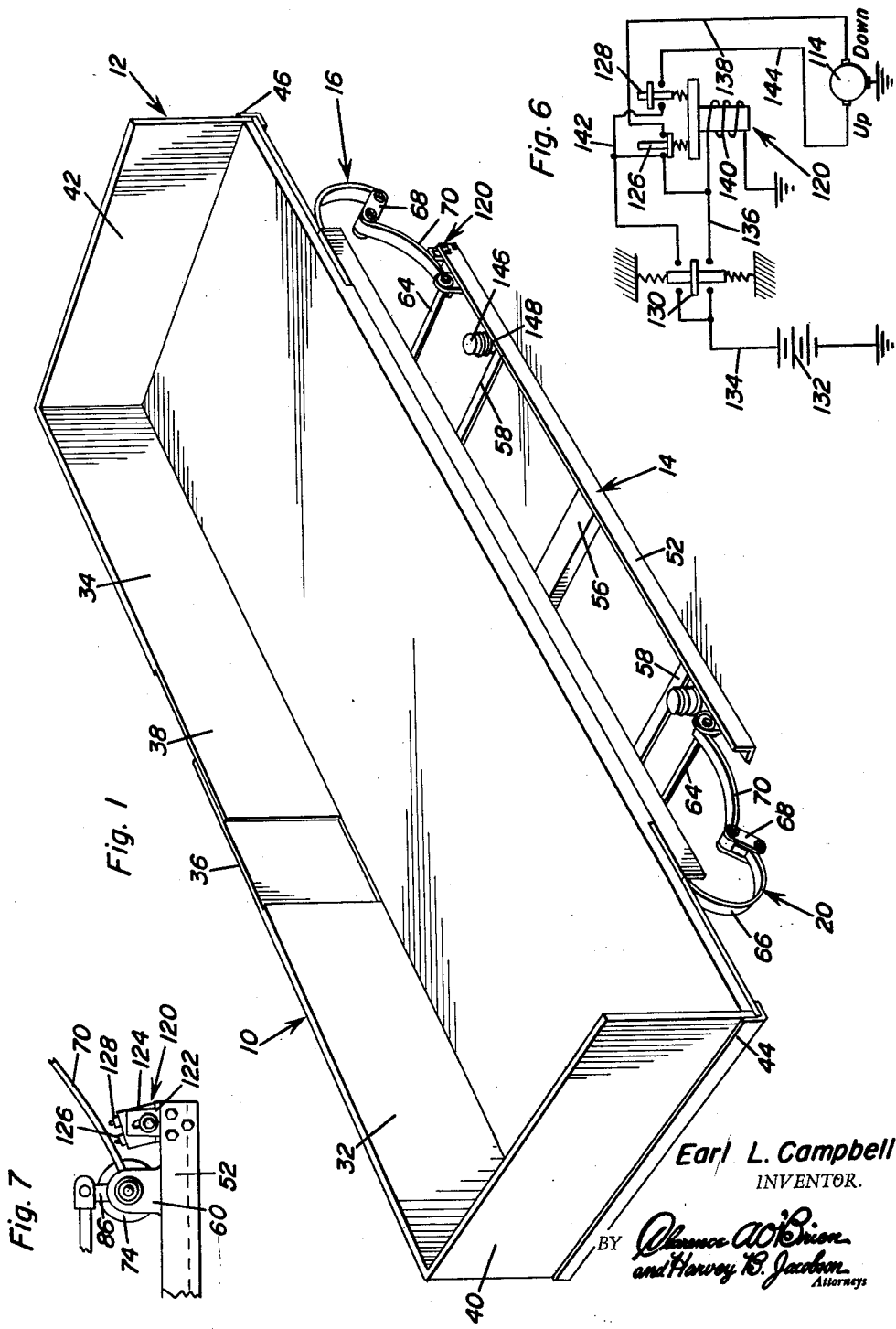
Earl L. Campbell
INVENTOR.

Dec. 11, 1962   E. L. CAMPBELL   3,067,437
ADJUSTABLE BED FOR TRUCKERS
Filed May 27, 1960   3 Sheets-Sheet 2
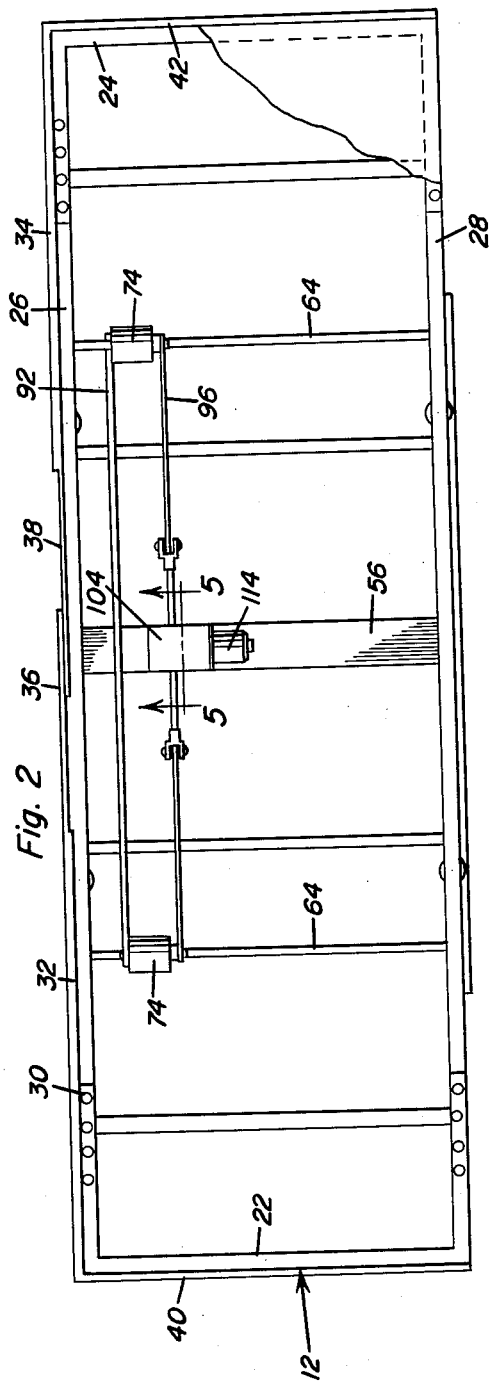
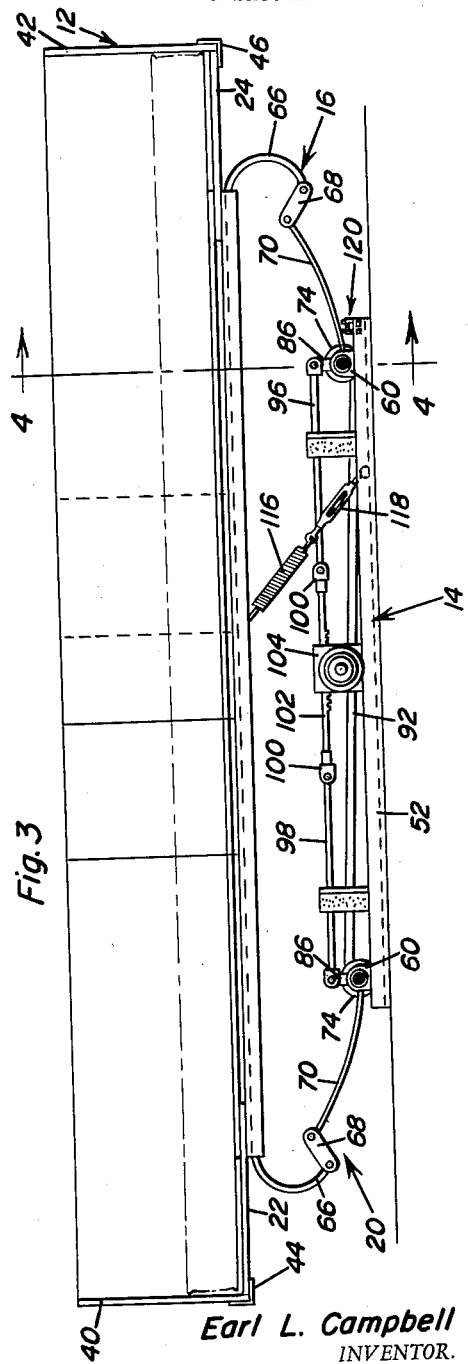
Earl L. Campbell
INVENTOR.

Dec. 11, 1962  E. L. CAMPBELL  3,067,437
ADJUSTABLE BED FOR TRUCKERS
Filed May 27, 1960  3 Sheets-Sheet 3

Earl L. Campbell
INVENTOR.

BY Clarence A. O'Brien
and Harvey B. Jacobson
Attorneys

United States Patent Office 3,067,437
Patented Dec. 11, 1962

1

3,067,437
ADJUSTABLE BED FOR TRUCKERS
Earl L. Campbell, 9601 Constitution NE.,
Albuquerque, N. Mex.
Filed May 27, 1960, Ser. No. 32,336
11 Claims. (Cl. 5—118)

This invention relates to an adjustable bed construction particularly useful for installation in moving vehicles.

It is therefore a primary object of this invention to provide a bed construction arranged to absorb and reduce shock and vibration to which the vehicle in which the bed is installed is subjected. The problem to which this invention relates is of particular concern to long line truck drivers who must sleep or recline about half the time during which their vehicle is moving. While in the reclining or sleeping position, however, the prior accommodations have been such that there was no relief from the continuous and sometimes severe road shock.

Another object of this invention in accordance with the foregoing object is to provide a bed supporting construction for installation in moving vehicle that includes a shock absorbing support for a bed frame which will absorb vertical displacement of the bed frame and include novel structure for converting horizontal displacements of the bed frame due to accelerations and decelerations of the vehicle into vertical displacement to be absorbed by the shock absorber.

A further object of this invention is to provide a bed supporting construction that is maintained in a predetermined vertically spaced relation to the floor for a given load on the bed and which is automatically operable upon selected conditioning of a control to vary the supporting characteristics of the construction so as to maintain the bed at the predetermined vertical spaced relation for any load deviating from the aforesaid predetermined load. Accordingly, the bed may be adjusted for persons of different weights so as to maintain the shock absorbing qualities for which the bed is designed despite any variation in the weight of the person using the bed.

In accordance with the foregoing objects, a horizontal rectangular bed frame is provided upon which a mattress may be placed, said frame being adjustable in length and width and having three sides for installation in a moving vehicle as, for example, the sleeper section of a truck cab, said horizontal frame being yieldably supported in the usual manner by leaf springs connected underneath the frame adjacent opposite ends thereof, said leaf springs being pivotally connected at their lower ends to a supporting frame which may be bolted or otherwise secured to the floor of the vehicle. The leaf springs ordinarily displaceable in both a vertical and a horizontal direction, rigidly interconnected at their lower ends so that displacement of one leaf spring will cause opposite angular displacement of the other leaf spring. Accordingly, all displacing forces on the frame tend to vertically displace the bed frame. The leaf springs instead of being fixedly anchored to the supporting frame are connected thereto by shock absorbing coil springs connected to the lower ends of the leaf springs, while an adjusting mechanism is provided for interconnecting the shock absorbing coil spring mechanisms so as to simultaneously vary the bias of the coil springs applied to each of the leaf springs resisting displacement thereof. The adjusting means may be selectively actuated by various mechanisms including an automatic mechanism which responds to displacement of the leaf springs beyond a predetermined amount due to excessively heavy persons, for example, reclining on the bed, to accordingly vary the bias of the shock absorbing coil springs on the leaf springs so as to tend to raise the frame in response to the additional weight placed thereon.

2

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 1 is a perspective view of the bed construction in accordance with this invention.

FIGURE 2 is a top view of the bed construction in accordance with this invention.

FIGURE 3 is an elevational view of the bed construction in accordance with this invention.

FIGURE 6 is a schematic circuit diagram of an automatic control for varying the spring bias of the shock absorbers.

FIGURE 7 is an enlarged detail view of a portion of FIGURE 3.

Figure 4:
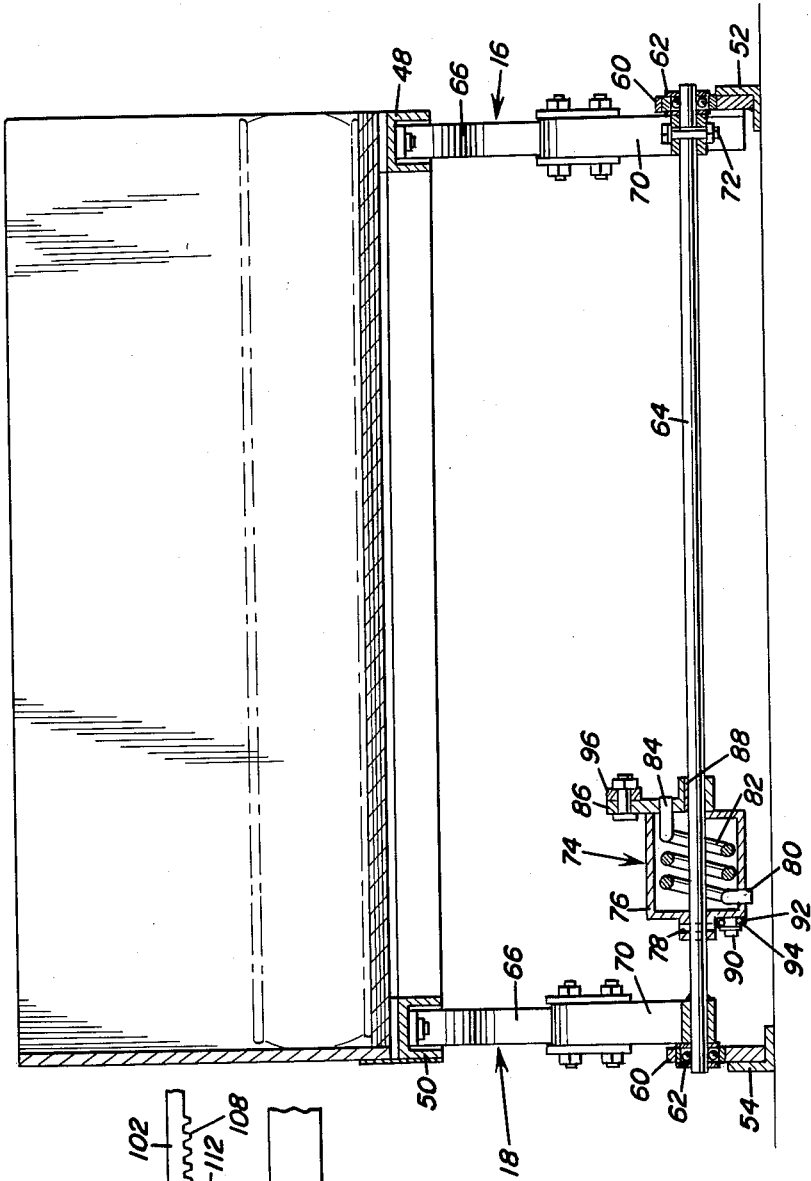
FIGURE 4 is a sectional view taken through a plane indicated by section line 4—4 in FIGURE 3.

Referring to the drawing in detail, FIGURE 1 shows the bed construction generally indicated by reference numeral 10. The bed includes a horiozntal mattress supporting frame assembly or body generally indicated by reference numeral 12 which is resiliently supported on a lower supporting frame or base 14 which may be bolted or otherwise secured to the floor of a moving vehicle. The frame 12 is yieldably supported on the supporting frame 14 by a spring suspension including two rear leaf spring assemblies 18, one of which is seen in FIGURE 4 and two front leaf spring assemblies 16 and 20 as seen in FIGURE 3.

The mattress supporting frame 12, as seen in FIGURE 2, includes end frame members 22 and 24 which are adjustably interconnected to a rear frame member 26 and a front frame member 28 by means of fasteners 30. Rear wall members 32 and 34 are connected to the rear of the bed frame, said rear walls 32 and 34 being also longitudinally adjustable relative to each other by means of overlapping portions 36 and 38 which are slidable relative to each other when being adjusted. End wall members 40 and 42 are connected to the end frame members 22 and 24, respectively, and are connected thereto by means of angle members 44 and 46, as seen in FIGURES 1 and 3, it being understood that these end members may also be modified to enable adjustment of the frame 12 in width. As more clearly seen in FIGURE 4, the rear and front frame members 26 and 28 have connected thereto at their undersides frame members 48 and 50. The rear walls 32 and 34 of the top frame assembly 12 constitute a backboard while the side walls 40 and 42 constitute head and footboards, all of which must be spaced from the installational environment a sufficient distance so as to permit movement of the top frame assembly without rubbing of its parts against the vehicle parts.

The lower supporting frame assembly 14 includes a pair of parallel longitudinal angle frame members 52 and 54 as seen in FIGURES 1, 3 and 4, said frame members 52 and 54 being spaced apart by means of a centrally disposed spacing bracket 56 and a number of transverse members 58. As more clearly seen in FIGURE 4, the frame members 52 and 54 have connected thereto at their outer ends a supporting bracket 60 within which there is mounted a bearing 62 for rotatably supporting between opposite brackets 60 a shaft member 64.

The spring assemblies 16, 18 and 20 each include an upper leaf spring portion 66 having its upper end bolted or otherwise secured to the upper frame members 48 and 50, as more clearly seen in FIGURE 4. A link or shackle clamp 68 is pivotally connected to the lower end of the leaf spring portions 66 and to the upper ends of second leaf spring portions 70. These spring assemblies thus constitute a commonly used yieldable spring suspension for a body frame. The lower ends of the leaf spring portions 70 are secured to the shafts 64 which are rotatably supported within the brackets 60 secured to the lower frame members 52 and 54 to thereby mount the spring suspension on the base 14. As seen in FIGURE 4, the rearwardly disposed spring assembly 18 is permanently connected to the shaft member 64 while the front assembly 16 is movably secured to the shaft member 64 as by bolt member 72. The spring assembly 20 is also similarly removably bolted at the lower end of the spring portion 70 to the shaft member 64.

Referring now to FIGURES 2 and 4, a shock absorbing coil spring mechanism generally indicated by reference numeral 74 is mounted on each of the shaft members 64 to which the lower ends of the spring assemblies are rigidly connected. Displacement of the spring assemblies would therefore tend to angularly displace the shafts 64 which are angularly yieldable rather than rigidly mounted, for shock absorbing purposes. The coil spring mechanisms 74 include a cylindrical housing portion 76 rigidly secured to the shaft members 64 by a pin 78, as seen in FIGURE 4, the cylindrical housing portion 76 having one end 80 of a coil spring 82 connected thereto with the other end 84 of said coil spring 82 being connected to a lever member 86 which is rotatably mounted on the shaft member 64 by means of bearing 88 as seen in FIGURE 4. On the end of the cylindrical housing portion 76 opposite from the lever member 86, an eccentrically disposed projecting pin 90 is provided to which a stabilizing link 92, as more clearly seen in FIGURES 2 and 3, is pivotally connected by means of ball bearing 94, as shown in FIGURE 4. It will be noted in FIGURE 3 that the rigid stabilizing link 92 is pivotally connected to pins 90 on both coil spring mechanisms 74, said pins 90 being disposed in diametrically opposite positions relative to each other so that rotation of one of the mechanisms 74 and pins 90 thereon in one direction will cause displacement of the stabilizing link 92 and effect rotation of the other mechanism 74 and pin 90 in an opposite direction. Both shafts 64 are therefore constrained to rotate in opposite directions. Accordingly, displacement of spring assembly 20, for example, in a clockwise direction will cause clockwise rotation of its associated shaft member 64, and by virtue of the stabilizing link connection 92 the other shaft member 64 and spring assembly 16 connected thereto will be caused to be displaced in a counter-clockwise direction. It will therefore be apparent that clockwise displacement of spring assembly 20 will effect a raising of the top frame assembly 12, avoiding tilting of the top frame assembly 12 and horizontal displacement thereof inasmuch as the link 92 will cause simultaneous counter-clockwise displacement of spring assembly 16 by an equal amount. Both spring mechanisms 74 are therefore operative to provide a combined bias on the interconnected shafts 64 tending to resist angular displacement in both directions of the spring assemblies 16 and 20 for example, as shown connected to the shafts 64 in FIGURE 3. Since the coil spring 82 in the mechanisms 74 combine to resist angular displacement in both directions, the direction of coiling of both springs 82 must be in the same direction in order to provide opposing biases in view of the interconnection of the shafts 64 by the link 92 for angular displacements thereof in opposite directions. The coiling of both springs 82 in the same direction is also required because of tension adjusting purposes.

Figure 5:
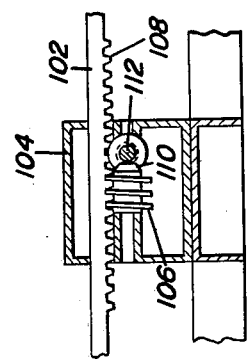
FIGURE 5 is a sectional view taken through a plane indicated by section line 5—5 in FIGURE 2.

Provision is therefore made for adjusting the tension of the spring mechanisms 74. Referring once again to FIGURE 4, the lever member 86 to which one end of the coil spring 82 is connected is pivotally connected to a link member 96, as more clearly seen in FIGURES 2 and 3. Similarly, the lever member 86 on the other coil spring mechanism 74 is pivotally connected to link member 98. The link members 96 and 98 are in turn interconnected by means of pivotal joints 100 to an adjusting rack member 102 which extends through a gear casing 104 mounted on bottom frame spacing member 56. As seen in FIGURE 5, the gear casing has rotatably mounted therein a worm gear 106 which meshes with the gear teeth 108 on the adjusting member 102, said worm gear 106 being drivingly connected by means of bevel gearing 110 to a control shaft 112 extending forwardly out of the gear casing 104. The control shaft 112 constitutes the motor shaft of a control motor 114 connected to the front side of the gear casing 104, as more clearly seen in FIGURE 2. It will therefore be apparent that upon energization of the control motor 114, rotation of control shaft 112 in one or the other direction will cause rotation of the worm gear 106 through the bevel gearing 110 to thereby cause linear movement of the control member 102 in one or the other direction. Accordingly, movement of the control member 102 will be imparted to the link members 96 and 98 to thereby angularly displace the lever members 86 in the same direction for varying the tension on the coil springs 82 in the same direction. Since the other ends 80 of the coil springs are rigidly connected with the shaft members 64 through the cylindrical casing portions of the coil spring mechanisms 74, the coil spring bias on the shaft members 64 and on the lower ends of the spring assemblies 16 and 18, for example, will be varied to thereby simultaneously vary the position and yielding characteristics of all four spring assemblies. Furthermore, an additional spring bias is imposed on the top frame assembly 12 by means of spring 116 connected to the top frame assembly 12 at one end and adjustably connected to the bottom frame assembly 14 by means of turnbuckle 118 to apply an initial bias or tension on the spring assemblies. It will therefore be apparent that movement of the control member 102 to the right, for example, will tend to rotate the coil springs 82 in such a direction as to increase its stiffness and thereby increase resistance of the spring assemblies to any load on the top frame assembly 12, tending to vertically displace them downwardly. Movement in the opposite direction of control member 102 will conversely reduce the resistance to downward vertical displacement of the spring assemblies.

Control mechanism is provided in order to control the energization of the control motor 114 for moving the control member 102 for the purpose hereinabove indicated. To readjust the bias of the spring mechanisms 74, therefore, a position responsive switch device generally indicated by reference numeral 120 as more clearly shown in FIG. 7 is provided at the right end of the lower frame member 52 and is mounted on an adjustable bracket member 122 for positioning the switch device in proper relation to the lower portion 70 of the spring assembly 16 so that vertical displacement of the spring assembly 16 beyond a predetermined amount will actuate the switch device to thereby deenergize the control motor 114 as explained hereafter. The switch device 120 includes a solenoid casing 124 adjustably secured to the bracket 122 which, when actuated by selective control, will place a pair of limit control microswitches 126 and 128 in position for actuation by the lower portion of the spring assembly 16.

Referring now to FIGURE 6, an exemplary control circuit diagram is shown which serves the purpose of energizing the control motor 114 for rotation in one or the other direction in order to restore the spring assembly to a predetermined or design position. A manually actuated switch 130 is provided which is biased toward a neutral position and when actuated in one or the other direction will close a circuit from battery 132 to energize the control motor 114. For example, when the switch 130 is depressed downwardly, a circuit is closed including wiring 134, 136, and 138 to energize motor 114 in one direction to reduce the resistance of the coil spring mechanisms 74, causing the spring assemblies to move downwardly under load. When the manual switch 130 is actuated in either direction, a circuit is closed also through the solenoid 140 to render the switch device 120 operative when energized by projecting the microswitches 126 and 128 upwardly into position for actuation by the lower portion 70 of the spring assembly 16. Accordingly, downward depression of the switch 130 in energizing motor 114 for rotation in one direction may initate downward movement of the spring assembly 16 so that the lower portion 70 of the spring assembly 16 will first actuate microswitch 126 normally biased to a closed position by the energized solenoid 140 as shown in FIGURE 6, to thereby open the circuit 134, 130, 136, 138 to the motor 114 so as to stop movement thereof. If the spring assembly 16 continues downwardly beyond its predetermined position, it will then actuate microswitch 128 which is normally held in open position by the energized solenoid 140, to thereby close circuit 134, 136, 142, 144, energizing motor 114 for rotation in a reverse direction causing spring assembly to move upwardly until the microswitch 128 is released. Accordingly, the control mechanism will accurately position the spring assemblies as long as the manual switch 130 is held depressed. If the spring assemblies are in proper position, the control motor 114 will not be energized at all even with depresing of the manual control switch 130 since both switches 126 and 128 will be open. When the manual switch 130 is moved upwardly into contact with the opposite contacts, the spring assemblies will be caused to be raised until they acquire their proper position in a manner similar to the previously explained operation.

Also provided on the lower frame assembly 14 are yieldable bumper means 146 about which coil springs 148 are provided, these bumper means serving to limit the downward movement of the top frame assembly 12 relative to the floor which may occur under severe and unexpected conditions.

Operation of the mechanism through which the bed construction is adjustable and operative to absorb and reduce the shock applied thereto will be apparent from the foregoing description. It will therefore be appreciated that the bed construction in accordance with this invention is readily and automatically adjustable for persons of different weights by use of a reversible electric motor 114 which may be controlled by selective conditioning of a control circuit including switch means which are responsive to displacement of the supporting spring assemblies from their desired or designed position to thereby energize the electric control motor to vary the spring characteristics of the spring assemblies so as to accommodate the weight of the person lying on the bed. It will also be appreciated that the shock absorbing spring mechanisms are operative to absorb displacement of the leaf spring assemblies and to change the biasing characteristics thereof under the automatic control means hereinabove described, while a stabilizer mechanism converts any horizontal displacement force applied to any of the spring assemblies into a vertical displacement effect on the top frame assembly, maintaining it in a horizontally level position with little horizontal displacement thereof. Accordingly, the top bed frame assembly will "float" to provide comfort and road shock relief at all times.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A shock absorbing bed for a moving vehicle comprising frame means, support means fixedly mounted in the vehicle, yieldable means connected to said support means and frame means for biasing said frame means to a predetermined vertically spaced position relative to said support means, stabilizing means operatively connected to said yieldable means independent of the frame means to convert horizontal displacing forces on said frame means into vertical displacements of said frame means and position responsive means operatively connected to said yieldable means for varying the load resisting bias thereof in accordance with displacement to said predetermined vertically spaced position for different loads carried by the frame means, said position responsive means including selectively conditioned control means rendered operative to sense displacement of said yieldable means beyond a predetermined amount for varying the yieldable bias on said yieldable means so as to maintain said predetermined vertically spaced position.

2. A shock absorbing bed for a moving vehicle comprising frame means, support means fixedly mounted in the vehicle, yieldable means connected to said support means and frame means for biasing said frame means to a predetermined vertically spaced position relative to said support means, stabilizing means operatively connected to said yieldable means independent of the frame means to convert horizontal displacing forces on said frame means into vertical displacements of said frame means and position responsive means operatively connected to said yieldable means for varying the load resisting bias thereof in accordance with displacement to said predetermined vertically spaced position for different loads carried by the frame means, said yieldable means comprising a plurality of spring means having upper ends rigidly connected to said frame means and lower ends pivotally connected to said support means, connecting means adjustably positioned on said support means and interconnected by the stabilizing means, shock absorbing means interconnecting said connecting means with the lower ends of said spring means to produce the load resisting bias on the frame means.

3. The combination as defined in claim 2, wherein said position responsive means includes power means for varying the position of said connecting means on said support means in accordance with limited displacement of the spring means to vary the bias of said shock absorbing means.

4. The combination as defined in claim 3, wherein the position responsive means further includes selectively conditioned limit control means mounted on said support means and actuatable by one of said spring means in response to displacement in excess of a predetermined amount to deenergize said power means.

5. A shock absorbing bed for a moving vehicle comprising frame means, support means fixedly mounted in said vehicle, yieldable means connected to said support means and frame means for biasing said frame means to a predetermined vertically spaced position relative to said support means, stabilizing means operatively connected to said yieldable means independent of the frame means to convert horizontal displacing forces on said frame means into vertical displacements of said yieldable means and position responsive means operatively connected to said yieldable means for varying the load resisting bias thereof so as to maintain said predetermined vertically spaced position for different loads carried by the frame means, said yieldable means comprising a plurality of spring means having upper ends rigidly connected to said frame means and lower ends, connecting shaft means adjustably positioned on said support means and connected to said lower ends, and shock absorbing means interconnecting said connecting means and the lower ends of said spring means, said stabilizing means comprising link means also interconnecting the connecting means and the lower ends of said spring means to constrain movement of the frame means in a vertical direction.

6. The combination as defined in claim 5, wherein said position responsive means includes power means for angularly varying the position of said connecting means on said support means to vary the bias of said shock absorbing means.

7. The combination as defined in claim 6, wherein the position responsive means further includes selectively conditioned limit control means mounted on said support means and actuatable by one of said spring means in response to excessive displacement thereof to deenergize said power means.

8. In a supporting assembly for beds mounted in a vehicle; a bed frame disposed above a base fixedly mounted in the vehicle for supporting a bed thereabove, a pair of shafts supported by and having their bearings in said base in spaced relation to the frame, mechanism connecting said shafts whereby rotation of one imparts reverse rotation to the other, shock absorbing spring means extending between said shafts independently of said frame to resist angular displacement thereof with respect to the base and yieldable suspension means connected to said bed frame and shafts for support of the frame by the shafts.

9. A bed supporting assembly subjected to continuous and erratic vibration imparted to a supporting frame comprising, a load supporting body vertically spaced above said frame, yieldable suspension means operatively connected to said body and frame for supporting said body vertically spaced above the frame, stabilizing means operatively connected to the yieldable suspension means for redistributing displacing forces imposed on the suspension means to counteract horizontal displacing forces imparted to the body, and shock absorbing means mounted on the frame and operatively connected to the stabilizing means and said yieldable suspension means for load resisting purposes with an adjustable bias.

10. The combination of claim 9 including position sensing means operatively connected to said shock absorbing means and selectively rendered operative to vary the bias thereof in accordance with a predetermined displacement of the yieldable suspension means.

11. The combination of claim 10, wherein said position sensing means comprises bias controlling limit switch means, means mounting said switch means in an inoperative position on the frame, selectively operative control means operatively connected to said mounting means for displacement of the switch means into an operative position for engagement by the suspension means, and control circuit means operatively connecting the selective control means through the switch means to the shock absorbing means thereby rendered operative to vary the load resisting bias and rendered inoperative by the switch means in response to engagement thereof by the yieldable suspension means.

References Cited in the file of this patent
UNITED STATES PATENTS

| | | |
|---|---|---|
| 389,609 | Smith | Sept. 18, 1888 |
| 567,708 | Goodwin | Sept. 15, 1896 |
| 600,018 | Pace et al. | Mar. 1, 1898 |
| 659,718 | True | Oct. 16, 1900 |
| 2,757,712 | Johnson | Aug. 7, 1956 |
| 2,853,310 | Allison | Sept. 23, 1958 |
| 2,893,750 | Allison | July 7, 1959 |